(12) United States Patent
Nagura et al.

(10) Patent No.: US 12,409,385 B2
(45) Date of Patent: Sep. 9, 2025

(54) PROGRAM, TERMINAL, AND GAME SYSTEM

(71) Applicant: BANDAI CO., LTD., Tokyo (JP)

(72) Inventors: Takashi Nagura, Tokyo (JP); Hideto Kotani, Tokyo (JP); Nao Yamaguchi, Tokyo (JP); Masahiko Saito, Tokyo (JP); Hyunsoo Lee, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 237 days.

(21) Appl. No.: 17/915,341

(22) PCT Filed: Mar. 23, 2021

(86) PCT No.: PCT/JP2021/011838
§ 371 (c)(1),
(2) Date: Sep. 28, 2022

(87) PCT Pub. No.: WO2021/200359
PCT Pub. Date: Oct. 7, 2021

(65) Prior Publication Data
US 2023/0166187 A1    Jun. 1, 2023

(30) Foreign Application Priority Data

Mar. 31, 2020 (JP) ................................. 2020-061902

(51) Int. Cl.
*A63F 13/00* (2014.01)
*A63F 13/537* (2014.01)
(Continued)

(52) U.S. Cl.
CPC ........ *A63F 13/537* (2014.09); *A63F 13/2145* (2014.09); *A63F 13/533* (2014.09)

(58) Field of Classification Search
None
See application file for complete search history.

(56) References Cited

U.S. PATENT DOCUMENTS 6,623,010 B1 * 9/2003 Holland, Jr. .............. A63F 1/02
273/306
7,081,882 B2 * 7/2006 Sowden .............. G06F 3/03547
715/762
(Continued)

FOREIGN PATENT DOCUMENTS

JP    2012-141739 A    7/2012
JP    2013-034624 A    2/2013
(Continued)

OTHER PUBLICATIONS

JP 2012 141739 A (Year: 2012) partial machine translation.*
(Continued)

*Primary Examiner* — Paul A D'Agostino

(57) ABSTRACT

The present invention addresses the problem of providing a program, a terminal, and a game system in which the usefulness to a user is improved. In the present invention, a game element for a deck selected from in-hand game elements of a player is displayed in a first region; the in-hand game elements are displayed in a second region wherein the first region and the second region are displayed on the same screen, and the game element is turned into a movable state on the screen under the condition that an operation is performed to a predetermined part of the game element displayed in the first region or the second region.

6 Claims, 15 Drawing Sheets

(51) Int. Cl.
*A63F 13/2145* (2014.01)
*A63F 13/533* (2014.01)

(56) References Cited

U.S. PATENT DOCUMENTS

| | | | | |
|---|---|---|---|---|
| 8,986,118 B2* | 3/2015 | Homer | ................ | G07F 17/3211 463/31 |
| 9,423,931 B2* | 8/2016 | Shimadate | .......... | G06F 3/04883 |
| 9,440,140 B1* | 9/2016 | Alqattan | ................... | A63F 1/04 |
| 9,770,649 B2* | 9/2017 | Chen | ................... | G11C 11/1673 |
| 2004/0036220 A1* | 2/2004 | Tanaka | ...................... | A63F 1/04 273/292 |
| 2006/0058093 A1* | 3/2006 | White | ................ | G07F 17/3293 463/13 |
| 2006/0068872 A1* | 3/2006 | Walker | ................... | G07F 17/32 463/13 |
| 2006/0202423 A1* | 9/2006 | Tanaka | ..................... | A63F 1/00 273/255 |
| 2007/0235940 A1* | 10/2007 | Stuart | ....................... | A63F 1/00 273/308 |
| 2008/0242389 A1* | 10/2008 | Jackson | .................. | G07F 17/32 463/13 |
| 2009/0104962 A1* | 4/2009 | Nicely | ................ | G07F 17/3258 463/18 |
| 2009/0124313 A1* | 5/2009 | Nicely | ................... | G07F 17/32 463/12 |
| 2009/0143141 A1* | 6/2009 | Wells | ................. | G07F 17/3239 463/37 |
| 2009/0278314 A1* | 11/2009 | Benzakarya | .............. | A63F 1/04 273/292 |
| 2009/0286583 A1* | 11/2009 | Barney | ............... | G07F 17/3244 463/13 |
| 2009/0309851 A1* | 12/2009 | Bernstein | .............. | G06F 3/0446 345/174 |
| 2010/0185977 A1* | 7/2010 | Ito | ......................... | A63F 13/426 715/790 |
| 2013/0277915 A1* | 10/2013 | Garrett | ..................... | A63F 1/02 273/293 |
| 2013/0290884 A1* | 10/2013 | Sotoike | ................... | A63F 13/42 715/765 |
| 2013/0296057 A1* | 11/2013 | Gagner | ............... | A63F 13/2145 715/863 |
| 2013/0316817 A1* | 11/2013 | Tanzawa | ............... | G06F 3/0481 463/31 |
| 2014/0100026 A1* | 4/2014 | Seo | ......................... | G06F 21/36 463/29 |
| 2014/0168119 A1* | 6/2014 | Esaki | .................... | G06F 3/0488 345/173 |
| 2014/0200083 A1* | 7/2014 | Tabata | .................. | A63F 13/822 463/42 |
| 2015/0113477 A1* | 4/2015 | Haussila | ............. | G06F 3/04847 715/810 |
| 2015/0348029 A1* | 12/2015 | Van Os | ................ | G06Q 20/401 705/44 |
| 2016/0074754 A1* | 3/2016 | Kuninobu | ........... | G06F 3/04842 463/31 |
| 2016/0117083 A1* | 4/2016 | Nishida | ................. | A63F 13/426 715/764 |
| 2016/0214014 A1* | 7/2016 | Shiota | ..................... | A63F 13/80 |
| 2016/0339336 A1* | 11/2016 | Matsui | ................. | A63F 13/533 |
| 2017/0323527 A1* | 11/2017 | Berman | .............. | G07F 17/3262 |
| 2023/0405478 A1* | 12/2023 | Qiao | .................. | H04N 21/4781 |
| 2024/0024774 A1* | 1/2024 | Putnam | .............. | G06Q 30/0272 |

FOREIGN PATENT DOCUMENTS

| | | |
|---|---|---|
| JP | 2014-120091 A | 6/2014 |
| JP | 2017-158984 A | 9/2017 |
| JP | 2018-109934 A | 7/2018 |

OTHER PUBLICATIONS

JP 2013 034624 (Year: 2013) partial machine translation.*
JP 2018 109934 (Year: 2018) partial machine translation.*
WIPO, International Search Report for International Application No. PCT/JP2021/011838, Jun. 15, 2021.
WIPO, Written Opinion for International Application No. PCT/JP2021/011838, Jun. 15, 2021.
Japan Patent Office, Office Action for Japanese Patent Application No. 2020-061902, Apr. 28, 2021 (A machine translation is attached hereto).
Japan Patent Office, Office Action for Japanese Patent Application No. 2021-184168, Dec. 20, 2023 (A machine translation is attached hereto).

* cited by examiner

In-hand Card Data D1

| Card identification information | In-hand flag | Use permission flag |
|---|---|---|
| 0001 | 1 | 1 |
| 0020 | 1 | 1 |
| 0003 | 1 | 1 |
| 0004 | 0 | 0 |
| ... | | |
| 1000 | 0 | 1 |

FIG. 6

Card Character Data D2

| Card identification information | 0001 |
|---|---|
| Character image | Image data |
| Card name | AAA |
| Kind of card | Field minion |
| The number of costs | 3 |
| Attribute | Red |
| Ethnicon | BBB |
| Ability | Flame |
| Attack power | 100 |
| HP | 300 |
| Rarity | 2 |
| Explanation | Text data |

FIG. 7

Deck Setting Data D3

| Deck 1 (Deck ID: D001) ||
|---|---|
| Card Identification Information | 0001 |
| Card Identification Information | 006 |

...

| Card Identification Information | 0450 |
|---|---|

FIG. 9

Buddy Setting Data D4

| Buddy identification information | 0001 |
|---|---|
| Buddy image | Data |
| Buddy name | AAA |
| Level | 2 |
| Character information | Data |

FIG. 10

PROGRAM, TERMINAL, AND GAME SYSTEM

TECHNICAL FIELD

The present invention relates to a program, a terminal and a game system.

BACKGROUND ART

In recent years, games using a smartphone, a mobile phone or the like as a platform, are popular. For example, such a game progresses by communication with a server (for example, Patent Literature 1).

Patent Literature 1 discloses technology in which a display is performed in accordance with a user's operation input to a touch panel.

CITATION LIST

Patent Literature

Patent Literature 1: Japanese Patent Application Publication No. 2017-158984

SUMMARY OF INVENTION

Technical Problem

In the above-described game, there is a demand for a proposal of a game in which a user's convenience is improved by devising ways of displaying objects displayed in the game. Therefore, to solve the problem, it is an object of the present invention to propose a program, a terminal and a game system configured to improve the user's convenience.

Solution to Problem

As an aspect of the present invention, a program causes a computer to perform display processing for displaying, in a first region, game elements for a deck, which are selected from game elements owned by a player, and displaying the owned game elements in a second region, wherein the first region and the second region are shown on a same screen; and control processing for making the game elements movable on the screen under the condition that an operation is performed to a predetermined part of the game elements shown in the first region or the second region.

As another aspect of the present invention, a terminal comprises a display unit which displays, in a first region, game elements for a deck, which are selected from game elements owned by a player, and displays the owned game elements in a second region, wherein the first region and the second region are shown on a same screen; and a control unit for making the game elements movable on the screen under the condition that an operation is performed to a predetermined part of the game elements shown in the first region or the second region.

As a still another aspect of the present invention, a system comprises a display unit which displays, in a first region, game elements for a deck, which are selected from game elements owned by a player, and displays the owned game elements in a second region, wherein the first region and the second region are shown on a same screen; and a control unit for turning the game elements into a movable state on the screen under the condition that an operation is performed to a predetermined part of the game elements shown in the first region or the second region.

Advantageous Effects of Invention

According to the present invention, it is possible to improve user's convenience.

BRIEF DESCRIPTION OF DRAWINGS

FIG. 6 is a diagram illustrating an example of in-hand card data.

FIG. 7 is a diagram illustrating an example of card character data

FIG. 9 is a diagram illustrating an example of deck setting data.

FIG. 10 is a diagram illustrating an example of a buddy setting data.

DESCRIPTION OF EMBODIMENTS

Embodiment According to the Present Invention

[Overall Configuration]

Figure 1:
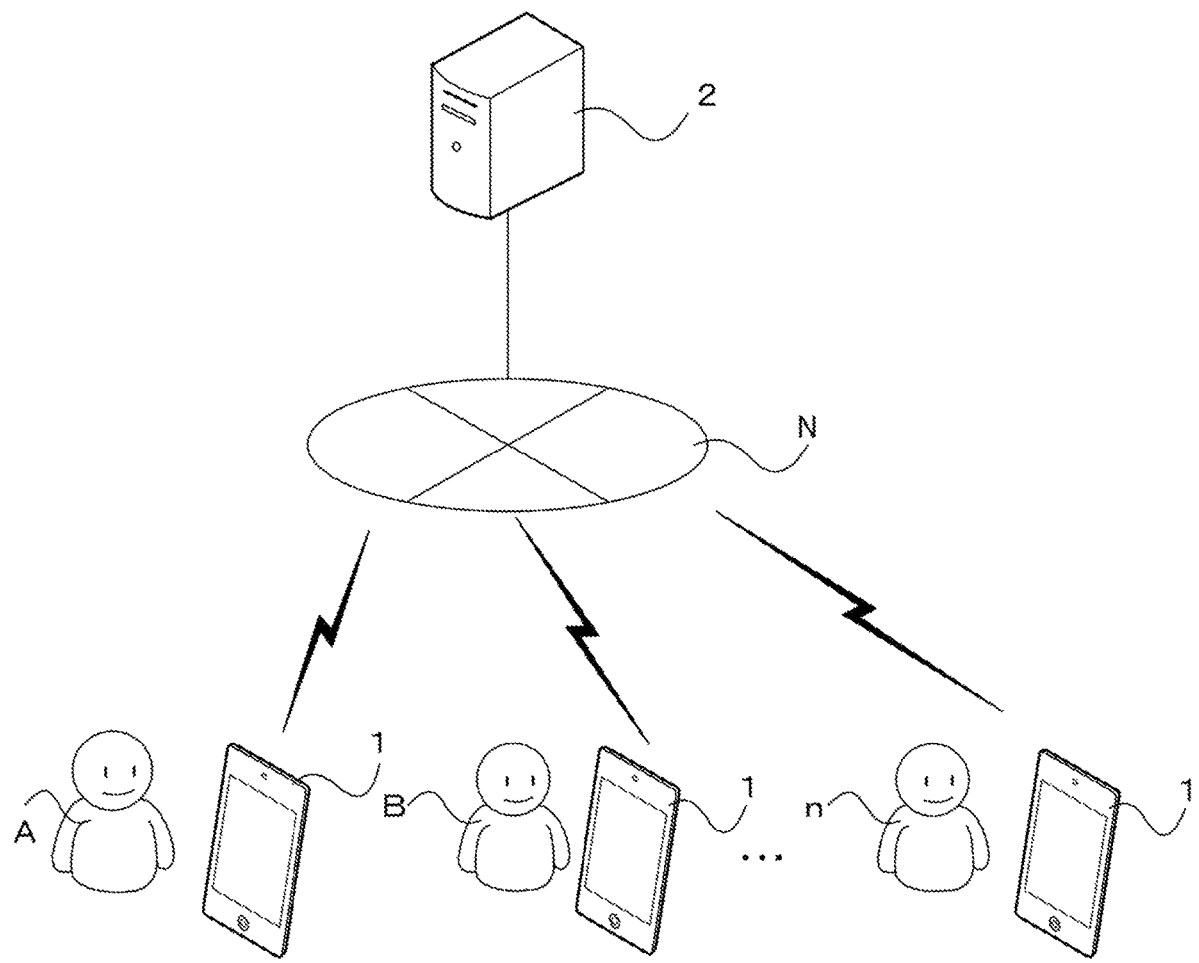
FIG. 1 is a diagram illustrating an example of the overall configuration of a game system according to the present embodiment.

FIG. 1 is a diagram illustrating an example of the overall configuration of a game system according to the present embodiment. As shown in FIG. 1, the game system comprises player terminals 1, which are provided to respective game players A, B; and a game server 2. The player terminals 1 and the game server 2 are capable of connecting to a communication line N and communicating with each other.

The communication line N represents a communication path capable of data communication. That is, the communication line N includes a communication network, such as a telephone communication network, a cable network, the internet, etc., in addition to a LAN established by a dedicated line (dedicated cable) for direct connection or an Ethernet (registered trademark) and the like. A communication can be achieved by any method, and may be either wired or wireless.

The player terminal 1 is a computer capable of running a game program, and can be connected to the communication line N via a wireless communication base station or the like, and can perform data communication with the game server 2. For example, the player terminal 1 may be a smartphone, a mobile phone, a portable game device, a stationary home game device, a business use game device, a personal computer, a tablet computer, and a controller for a stationary home game device or the like. Basically, there are multiple player terminals 1, which are operated by respective players.

The game server 2 is a server system configured by including one or a plurality of server devices and memory devices or the like. The game server 2 provides various services for running a game according to the present embodiment. The game server 2 can perform data management required to run the game, and delivers the game program and data required for performing the game at the player terminal 1 or the like.

Figure 2:
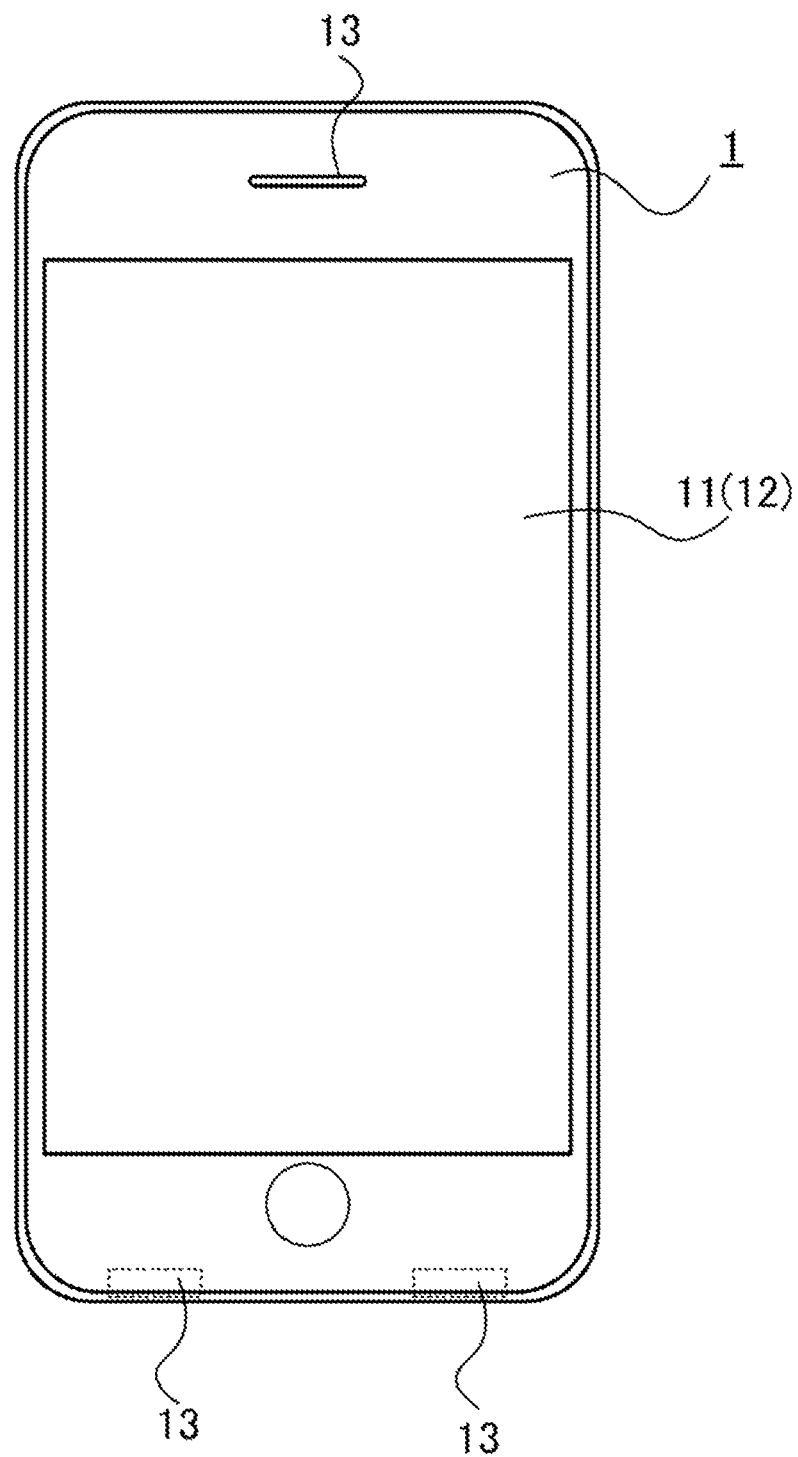
FIG. 2 is a diagram illustrating an example of the device configuration of a smartphone, which is an example of a player terminal 1.

FIG. 2 is a diagram illustrating the device configuration of a smartphone, which is an example of the player terminal 1. As shown in FIG. 2, the player terminal 1 includes a display 11, a touch operation panel 12 integral with the display 11, and a speaker 13. Although not illustrated, a control board, a built-in battery, a power button, and a volume control button and the like are provided in the player terminal 1.

On the control board, various microprocessor(s), such as a CPU, a GPU, a DSP, etc., various IC memories, such as an ASIC, a VRAM, a RAM, a ROM, a wireless communication module for wirelessly communicating with a mobile phone base station and the like are mounted. Further, on the control board, a so-called I/F circuit (interface circuit), such as a driver circuit for the touch operation panel 12, etc., is mounted. These elements mounted on the control board are electrically connected with one another via a bus circuit etc., and are connected so as to be able to read and write data, and to transmit and receive signals.

Described blow is an example according to the present embodiment, wherein the above-described game system is applied to a match-up game that uses game elements owned by the first player A and game elements owned by a second player B, who is an opponent.

Here, each of the first game element is a character represented by being embodied in an image, or as a virtual or substantial article or the like. The image includes a still image, a video image. An example of the virtual or substantial article is a virtual card displayed on a computer or a substantial card and the like. In addition, the article is not limited to such a card as long as such a game element associated with the article can be identified. For example, the article may be a sculptural object, such as a figure having an appearance of a game element.

In the description set forth below, it is premised that, in a game to be performed, such a first game element is a character whose action is controlled based on an operation to a card by the player (including a non-player operated by a computer), and that a corresponding character design (an image exhibiting an exterior appearance of the character) is attached to the card. In addition, the character is not limited thereto, and may be one for identifying some other game element such as an item in the game to be performed, or an effect to be invoked etc.

A deck is composed of a predetermined number of first game elements. The predetermined number of first game elements is set as a player's deck. For example, where the first game elements are virtual cards displayed on a computer, the deck is composed of a group of the predetermined number of cards selected by a player. The player selects a desired deck from among decks set by the player, and plays a game by using the cards forming the deck.

Further, a second game element different from the first game element is added to the battle game to which the present embodiment is applied.

Although the second game element is a character similar to the first game element, the second game element need not be associated with a virtual or substantial article. The second game element is different from the first game element and is not operated by the player (including a non-player operated by a computer) in a battle of the game. The second game element has a nature of providing the player with advice information, which is information related to a progress of the game at least in a phase where the player can perform an operation.

In other words, it can be said that the second game element provides the advice information autonomously or voluntarily in the game, unlike the first game element whose action is controlled based on an operation of the player (including a non-player operated by a computer).

The advice information may be any type of information as long as it relates to a progress of the game, for example, information of an operation method, information related to selection and actions of first game elements, (advice information such as card selection, cards of the opponent in the battle who is a target of attack and so on), and information, which turns progress of the game in favor (advice information, such as presentation of a card type, which provides advantageous effects to the battle result of the game) or the like.

The contents of the advice information and timing of provision thereof change in accordance with the character information of the second game element. The character information changes in accordance with a progress of the game played by the player. The character information may have a plurality of parameters. For example, in the present embodiment, the character information includes a parameter which changes in accordance with an empirical value obtained from results of games played by the player (hereinafter referred to as a level); a parameter which changes in accordance with use frequency of the first game elements used by player (hereinafter refer to as a card comprehension level); a parameter which changes in accordance with a use ratio of each of kinds of the first game elements the player used (hereinafter referred to as personality); and a parameter which changes in accordance with achievement of a predetermined event by the player (hereinafter referred to as synchronizing level). Accordingly, it should be noted that there is a possibility that the advice information provided by the second game element is different depending on the character information of the second game element.

The number of the second game elements may be two or more, and each second game element may have different character information at an initial stage. And the player may select a desired second game elements from a plurality of second game elements whose character information is different from each other.

The above-described autonomous or voluntary advice information of the second game element is provided by an AI function included in the game server 2. This AI function can be realized by a learning model obtained by performing machine learning which uses, as training data, details of progress and results etc. of many battle games. Although a deep learning (deep machine learning), a reinforcement learning, or a combination thereof may be a typical machine learning, it is not limited thereto. In the learning model, the content of the advice information, which differs depending on the character information of the second game elements, can be output. As a way to realize this, for example, there is a learning model etc., in which the higher the character information level of the second game element is, the more appropriate solution can be obtained in a certain situation by, for example, making the search time for the optimal solution longer as the character information level of the second game element is higher.

The above-described second game element may be called a buddy in a description below.

[Outline of Game]

Next, to help understanding of the present embodiment, an overview of a game will be described by using display screens displayed on the display 11 of the player terminal 1.

In a game according to the present embodiment, virtual game cards, which are game objects (first game elements, in each of which a character is embodied, and which is hereinafter simply referred to as "cards"), are used. Two or more kinds of cards are prepared, and are distinguished from each other by combinations of an ability of a character, rarity, an attribute (color), a numeral and the like, which are associated with each card. As the ability of the character, for example, ability parameter values such as a level, an attack power, and HP (hit point), etc., which are used in a match-up play (a battle) against a battle opponent, such as an enemy character controlled by a computer, or another player, etc., are predetermined.

Although the cards displayed on the display 11 are virtual, each of the cards has a front face and a back face similarly to a real card. Since all the cards have the same back face, the card can not be identified when the back face is displayed. On the other hand, information from which the card can be identified is shown on the front face. The information from which the card can be identified, includes a picture/pattern from which the character or ability thereof associated with the card can be intuitively identified, information related to the rarity and the level, explanation of the card and the like. Description will be given below, using cards each having a front face on which a picture/pattern and an explanation about the card are shown.

A minimum number of cards required in a match-up play (battle) is given when an account is registered. Further, the cards can be acquired during a game, or the cards can be acquired by purchasing them as charge items or by a drawing called Gacha. In addition, such a card can be acquired by obtaining a substantial game card (hereinafter referred to as a "real card") and completing a registration process to make the obtained real card usable in the game. Specifically, when the player A or B registers the real card, the player can acquire a card having a card kind which corresponds to the real card. In the description set forth below, cards which respectively have a rectangular shape as with general cards are exemplified.

The player A then composes a deck by selecting a predetermined number of cards (for example, 40 cards) from among cards owned by the player, and challenges to the match-up play (a battle) using the deck. In the match-up play (battle) using the deck, a win or loss of the battle against an opponent is determined by using an ability parameter value of a character defined in each of the cards forming the deck (deck cards) and a setting value of the attribute of the card.

When starting the game, the players A and B complete registration of their accounts. The player selects a desired buddy (hereinafter referred to as a buddy) from among two or more second game elements which are presented by the player terminal 1 at the time when the players register their accounts so that the buddy who forms a group together with each of the player A and B is set. There is a possibility that a play style of the game changes later on, due to a difference in the ability and character of the selected buddy. And the players A and B respectively form their decks by selecting a predetermined number of cards (for example, 40 cards) from among cards respectively owned by them. The deck can be formed from a deck formation menu, which is presented as a result of touching one on the card menu on a home screen or the like. The match-up play (battle) is started by performing an operation for selection of a battle menu from the home screen displayed after login.

Figure 3:
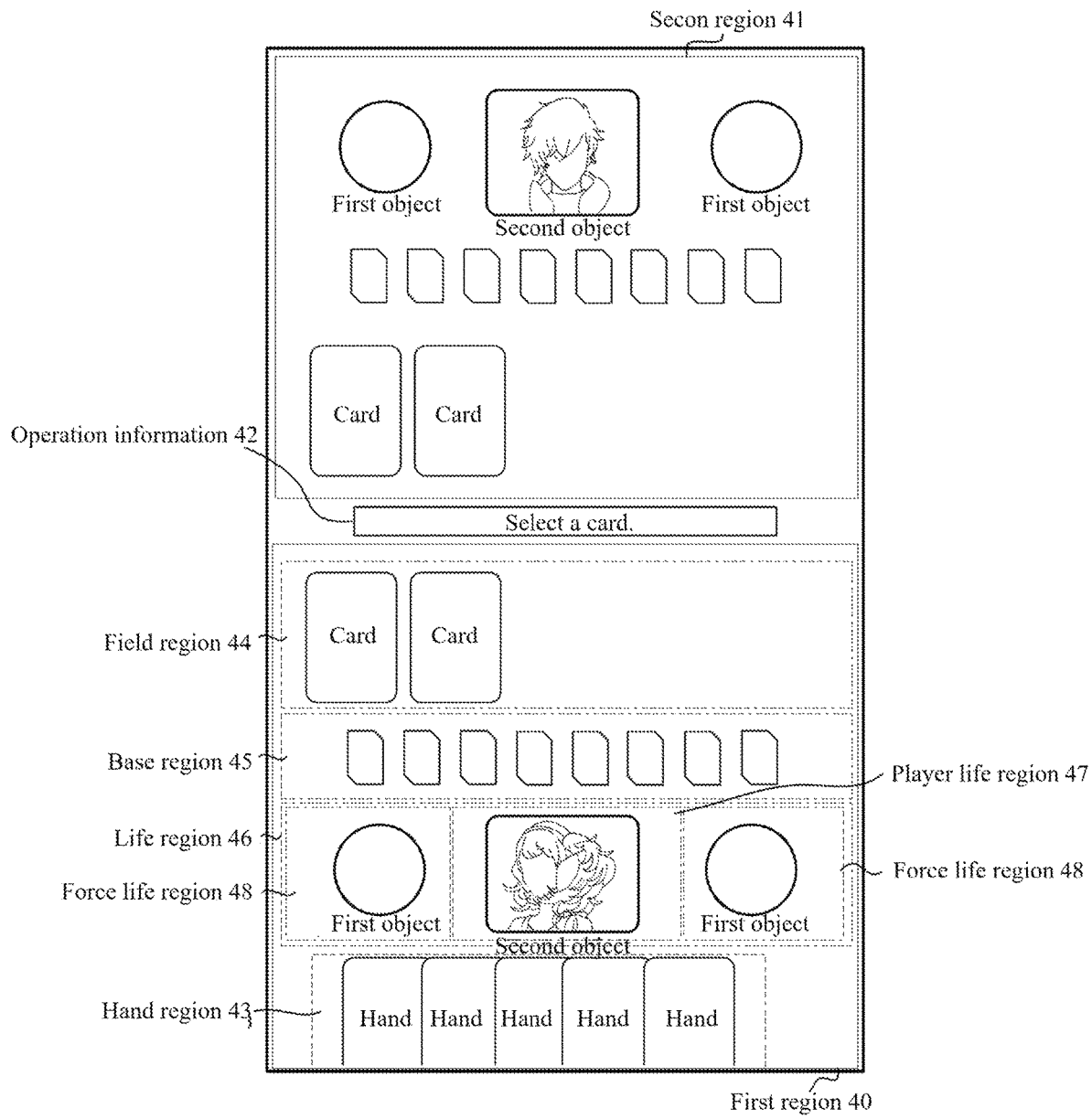
FIG. 3 is a diagram illustrating an example of a screen display in a stand-by phase or card use preparation phase of a battle game, which is displayed on a display 11 of the player terminal 1.

FIG. 3 is a diagram illustrating an example of the battle screen for a battle game displayed on the display 11 of the player terminal 1. The battle screen displayed on the display 11 includes a first player region 40 which is a region for the own player and a second player region 41 which is a region for an opposing player in the battle. Each region of the battle screen is fixed. Further, on a boundary between the first player region 40 and the second player region 41, operation information 42, which is information of a currently available operation, is displayed.

Each of the first player region 40 and the second player region 41 includes a hand region 43, a field region 44, a base region 45 and a life region 46. In the hand regions 43, cards (hands) acquired from his or her own deck are arranged. Cards selected by the player from either the hand region 43 or the base region 45 are arranged in the field region 44. The cars in the hand region 43 can be placed in the field region 44 by respectively consuming a prescribed cost. Each of the cards arranged in the field region 44 can invoke an action or an effect of the card. In the base regions 45, cards and mana items to be consumed as costs for arranging cards in the field region 44 are arranged. The life region 46 includes a player life region 47 which is a region for the player having a life (HP) and a force life region 48 which is a region for a first object (force) having also a life. In the player life regions 47, a second object corresponding to the player and a value of the life owned by the player are displayed. In the force life region 48, first objects and life values owned by the first objects, are respectively displayed. The first object demonstrates a specific effect in the game. Further, in this example, an image of the buddy is displayed as the second object.

In the battle, a turn of the player A and that of the player B who is an opponent of the player A in the battle alternatively come. Each of these turns includes a plurality of phases such as a standby phase, a mana phase (a card use preparation phase), and a main phase (a battle phase) or the like.

Figure 4:
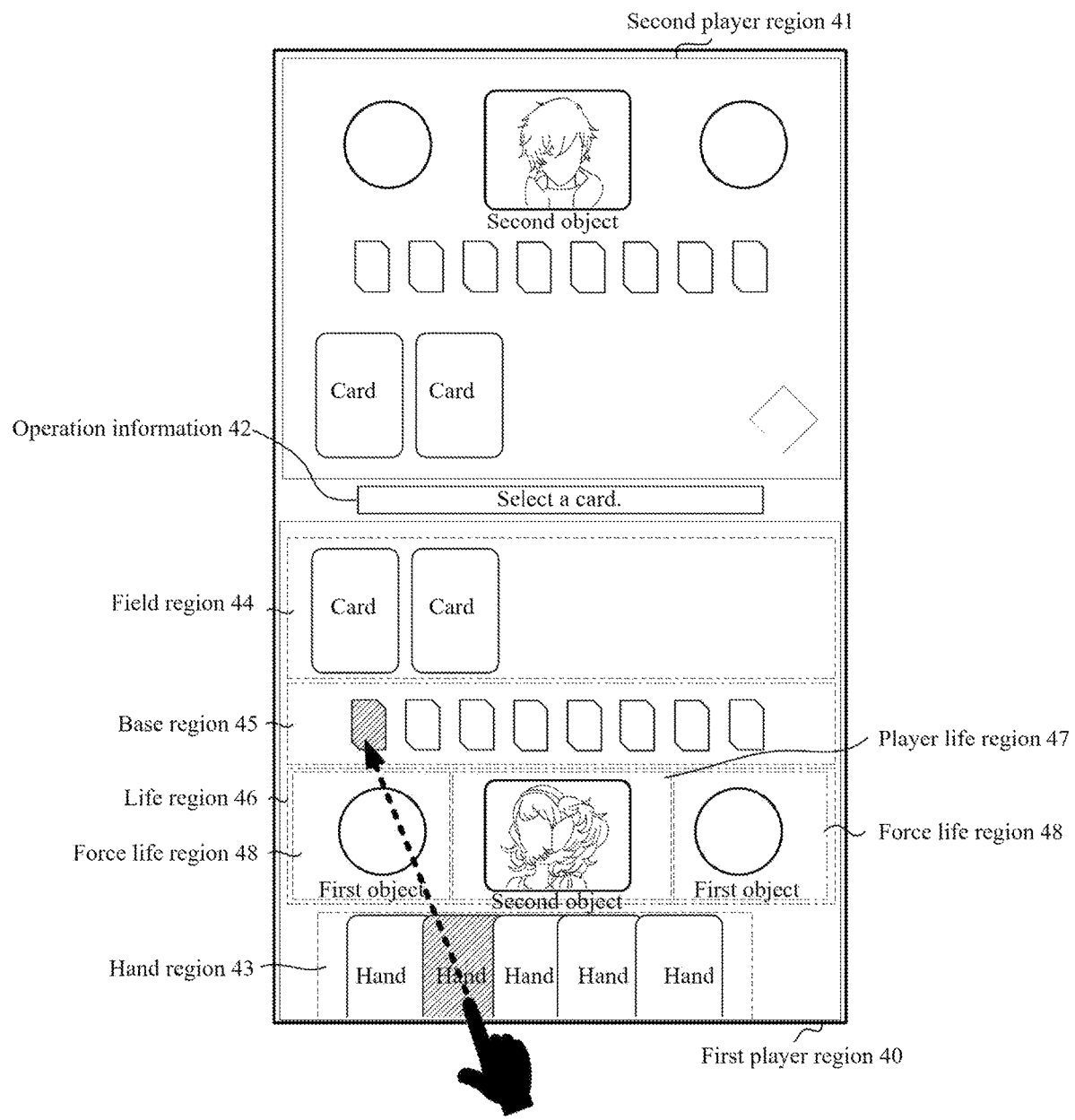
FIG. 4 is a diagram illustrating an example of an operation in a stand-by phase or card use preparation phase of a battle game, which is displayed on a display 11 of the player terminal 1.

The standby phase comprises a step in which cards drawn from the deck are placed in the hand region 43 or the like. In the mana phase, the player can place his or her cards or mana items in his or her own base region 45 of the player. For example, as illustrated in FIG. 4, the player touches (selects) a card in the hand region 43 and swipes it to the base region 45 with a finger (also referred to as a drag operation or slide operation) thereby moving the card to the base region 45. Further, a mana item displayed at a predetermined position in the first player region 40 during the mana phase can also be placed in the base region 45 by touching (selecting) it with a finger and performing a drag operation thereon to the base region 45. The consumption of the card or mana item as a cost is enabled by placing it in the base region 45. Here, the player may terminate the mana phase without placing the card or mana item in the base region 45.

In the main phase, the player can perform a summon of a character, an attack against an opponent (attack), activation of a card effect, and movement of a card, etc. The summon of a character is performed by placing a card in the field region 44 under the condition that a payment is made as a cost therefor.

The attack against an opponent (attack) comprises a plurality of steps such as an attack designating step, a flash timing step, a block designation step, a battle settlement step and the like. In the attack designation step, the own player selects an attack target from the opponent and a force. In the flash timing step, the own player and the opponent player can respectively use a specific card having a special effect. In the block designation step, the opponent player can select whether or not to block the attack made by the own player, by using a card placed in the field region 44 of the second player region 41. In the battle settlement step, the result of the attack is judged, and based on the judgement result, solution processing is performed wherein the card on the attacking side and blocking side is vanished, and a life of the opponent player or that of the force etc. is reduced and so on.

In the activation of a card effect, a special effect of a specific card (for example, a magic card) arranged in the hand region 43 is activated, conditional upon a compensation of a cost. In addition, regarding the movement of a card, the card is moved between the field region 44 and the base region 45. The player may terminate the battle phase without performing any one of: the summon of a character, the attack against an opponent (attack), the activation of the card effect, the movement of a card and the like.

A turn of the player A team, which comprises such a series of phases, and that of the player B team, who is an opponent in the battle, are alternatively repeated, and a win or loss thereof is determined when the life of either of the players reaches zero or the number of cards of his or her deck reaches zero. The rank of the player, the buddy's empirical value and character information of the buddy etc. (changing ability information) change in accordance with the battle result in the game.

[Configuration of Device]

Figure 5:
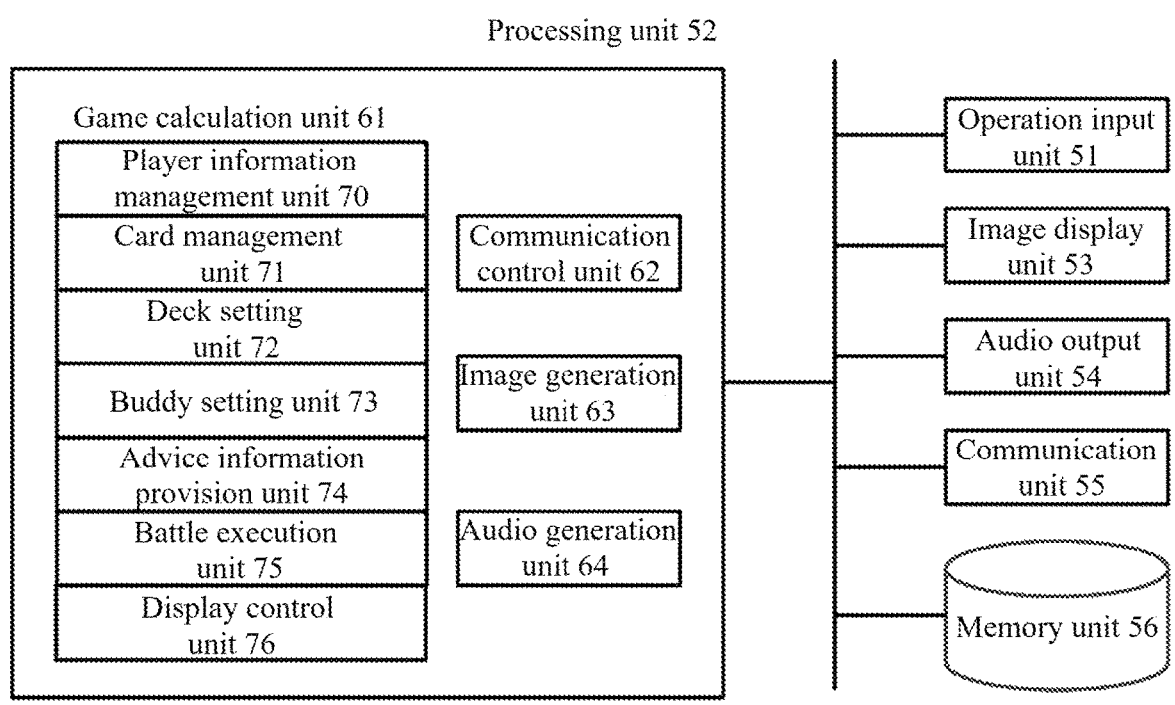
FIG. 5 shows a schematic view of the display terminal 1.

Next, the configuration of the device is described. FIG. 5 is a block diagram illustrating a functional configuration of the player terminal 1. As shown in FIG. 5, the player terminal 1 includes an operation input unit 51, a processing unit 52, an image display unit 53, an audio output unit 54, a communication unit 55 and a memory unit 56.

The operation input unit 51 is provided to receive various operation inputs relating to the game, and outputs, to the processing unit 52, an operation input signal which corresponds to the operation inputs. Functions of the operation input unit 51 can be achieved by an element directly manipulated by a finger of the player A, such as a touch operation pad (touch panel), a home button, a button switch, a joystick, a trackball, etc. Functions of the operation input unit 51 can also be achieved by an element, which detects motion or posture, such as an acceleration sensor, an angular velocity sensor, an inclination sensor, and a geomagnetic sensor, etc. In the description set forth below, a touch panel is exemplified as such an element. The touch operation panel 12 shown in FIG. 2 corresponds to this element. Types of operations detected by the operation input unit 51 are, for example, a tap (a single tap, a double tap, a long pressing operation etc.), a flick, and a slide (swipe). The operation input unit 51 detects an operation input (a type of the operation and the position of the operation) performed by the player to the touch operation panel 12 and outputs an operation input signal corresponding to the detected operation input.

The processing unit 52 integrally controls an operation of the player terminal 1 based on the programs and data stored in the memory unit 56 and the operation input signal from the operation input unit 51 or the like. Functions of the processing unit 52 can be achieved by, for example, a microprocessor, such as a CPU, a GPU, etc., and electronic components such as an ASIC and an IC memory etc. The processing unit 52 includes, as main functional units, a game calculating unit 61, an image generation unit 62, and an audio generation unit 63 and a communication control unit 64.

The game calculating unit 61 performs various game processing for realizing a game according to the present embodiment, and outputs a processing result thereof to the image generation unit 62 and the audio generation unit 63. The game calculating unit 61 includes a player information management unit 70, a card management unit 71, a deck setting unit 72, a buddy setting unit 73, an advice information provision unit 74, a battle execution unit 75, and a display control unit 76.

The player information management unit 70 manages information of the players. The information to be managed is, for example, basic user information such as player's nickname, a rank of the player, a level of the buddy and the like.

The card management unit 71 performs management of cards which can be provided by the game system by using in-hand card data D1 and card character data D2, which is stored in the memory unit 56, including management as to whether the player owns the cards.

In the in-hand card item data D1, card identification information of cards which can be provided by the game system, an in-hand flag indicating whether or not the player owns the card, and a use permission flag indicating whether or not the player can use the card, are associated with one another. FIG. 6 is a diagram illustrating an example of the in-hand card data D1. In FIG. 6, the card identification information of the cards which can be provided by the game system is recorded in the field of card identification information. And when the player owns the cards, "1" is set to the field of the in-hand flag corresponding to the card identification information of the owned cards, and "0" is set to the field of the in-hand flag as to cards the player does not own. In addition, when cards can be used by the player, "1" is set to the field of use permission flag corresponding to the card identification information of these cards, and when the card cannot be used by the player, "0" is set to the field of use permission flag corresponding thereto. FIG. 6 shows an example of the in-hand card data D1, but the in-hand card data D1 is not limited thereto.

In addition, even when "0" is set to the field of the in-hand flag, there are some cases where "1" is set to the field of the use permission flag. For example, even if there is a card the player does not own, the player is temporarily permitted to use the card.

The card character data D2 includes data in which card identification information of cards and character information of these cards are associated with each other. FIG. 7 is a diagram illustrating an example of the card character data D2. In FIG. 7, the card identification information; character information (a character image, a card name, the kind of the card, the number of costs, attribute, ethnicon, ability, an attack power, hit point, rarity); and an explanation thereof (text data) are associated with one another. In addition, FIG. 7 shows an example of the card character data D2, but the card character data D2 is not limited thereto.

When there is a card which can be newly provided, the card management unit 71 acquires card identification information of the card and card character data D2 corresponding to the acquired card identification information, through communications with the game server 2. And, the card management unit 71 additionally adds the acquired card identification information to the in-hand card data D1, and the in-hand flag of the card identification information is set to "0" and the field of the use permission flag is set to "0". In addition, the acquired card character data D2 is stored in the memory 56. And when the player newly acquires and owns a card, the card management unit 71 sets the in-hand flag corresponding to card identification information thereof to "1" and sets the field of the use permission flag to "1".

The deck setting unit 72 performs various processing relating to a deck such as composition of the deck (new creation, change), copy, deletion and the like. The deck setting unit 72 presents currently-useable cards (in-hand card, as a general rule) which can be used as cards for forming his or her deck, by using the in-hand card data D1 and the card character data D2, and the user selects cards for forming the deck from the presented cards by an operation of the user, whereby the deck is formed.

Figure 8:
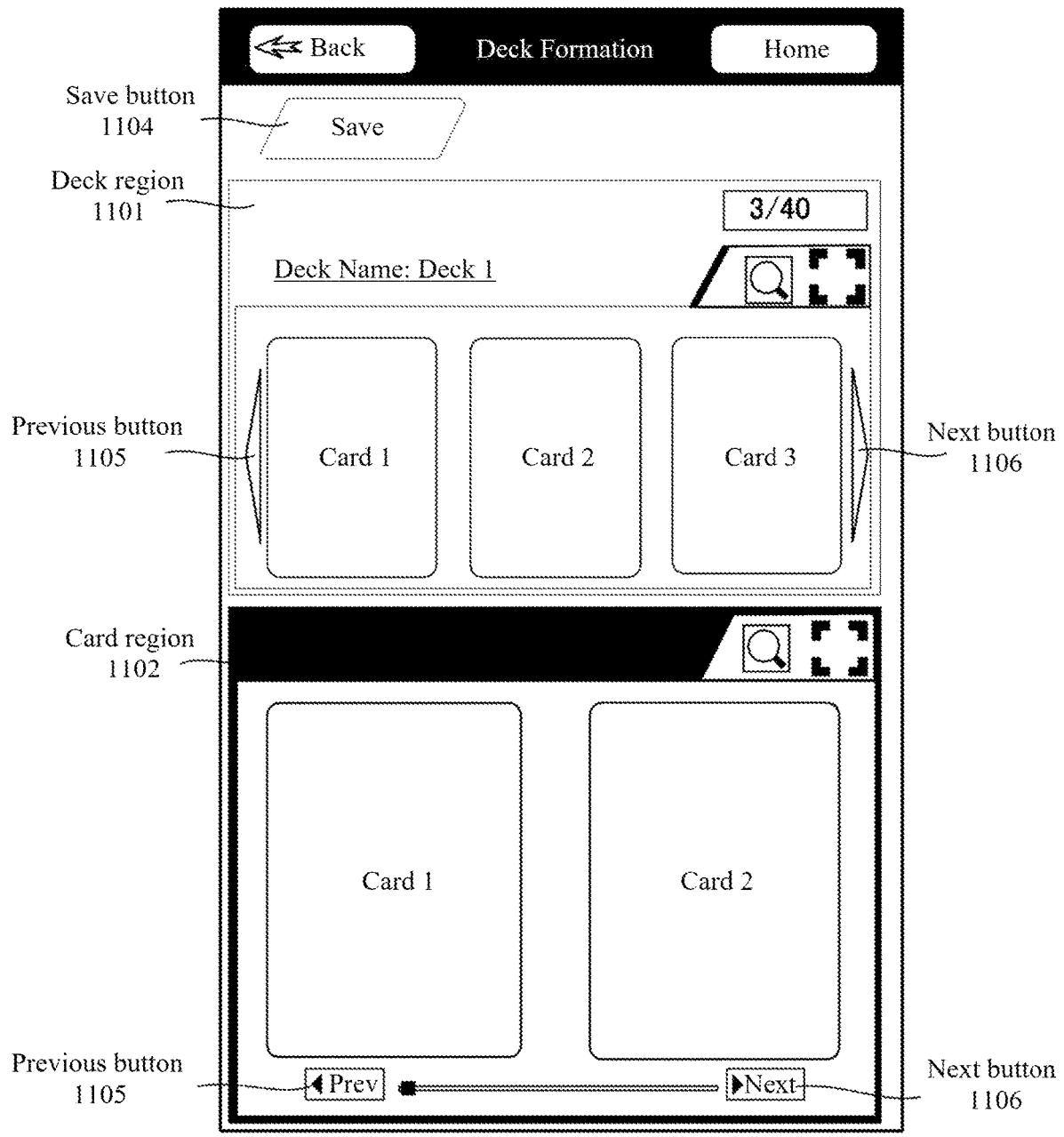
FIG. 8 is a diagram illustrating a deck formation screen.

Here, a deck formation screen is explained. FIG. 8 illustrates an example of the deck formation screen.

Regarding the deck formation screen, as shown in FIG. 8, a deck region (first region) 1101, a card region (second region) 1102, a deck name region 1103, a save button 1104, a previous button 1105 and a next button 1106 are arranged on the same screen.

When the player performs a slide (swipe) operation to a card displayed in the card region 1102, for moving the card to the deck region 1101, the moved card is displayed on the deck region 1101. The cards which form a deck are displayed as a list of a predetermined number of cards so as not to be overlapped each other. The size of the deck region 1101 is fixed.

In the card region (second region) 1102, cards the player owns are displayed. The in-hand cards are acquired by satisfying predetermined conditions. The size of the card region 1102 is fixed in the deck region 1101.

The deck name region 1103 is a region where a name of deck, which is under editing, is displayed. When a deck is newly created, the deck name region 1103 is blank, and the player inputs an arbitrary deck name therein. When the deck is modified, a deck name, which has been already given to the deck, is displayed in an editable state in the deck name region 1103.

The save button 1104 is used for saving the deck formed by the player.

The previous button 1105 and the next button 1106 are displayed in the deck region 1101 and the card region 1102 respectively. The previous button 1105 and the next button 1106 are used for page feeding in order to display cards which are not displayed. This is because the number of cards displayed in the deck region 1101 and the card region 1102 is limited.

The deck setting unit 72 temporarily stores the deck name inputted by the player in the deck name region 1103 of the deck formation screen, in a work area of the memory unit 51. In addition, the card identification information of the card to which the player performs a slide operation from the card region 1102 to the deck region 1101, is temporarily stored in the work area of the memory unit 51. When the player sends an instruction for selecting the save button 1104, the deck setting data (FIG. 9) is generated by using the deck name stored in the work area and the card identification information, and associating the deck composed of the cards displayed in the deck region 1101, the deck name, and the identification information of the deck (deck ID) with one another, and the deck setting data is stored in the memory unit 51.

FIG. 9 is a diagram illustrating an example of the deck setting data D3. FIG. 9 shows an example of the deck setting data D3 for the deck 1 of the player A. The "Deck 1" is a deck name which is inputted in the deck name region 1103. In the example of FIG. 9, the deck 1 having a deck ID "D001" comprises cards having card identification information "0001", "0006", . . . card identification information "0450". Here, FIG. 9 shows an example of the deck setting data D3, and the deck setting data D3 is not limited thereto.

The buddy setting unit 73 manages information relating to buddies selected from a plurality of buddies (second game elements) by the players A and B, using the buddy setting data D4 at account registration. The buddy setting data D4 is character information of the buddies selected by the menu setting. This character information of the buddy changes as the game proceeds, and if it changes, after the change, the character information is notified by the game server 2, and the character information is updated. FIG. 10 shows an example of the buddy setting data D4 of the player A. In the example of FIG. 10, each piece of the buddy setting data D4 includes buddy identification information, an image of buddy, a buddy name, a level, character information. FIG. 10 shows an example of the buddy setting data D4, but the buddy setting data D4 is not limited thereto. The level of the buddy (second game element) and the character information thereof are set to an initial value (the lowest value) at the time of the account registration. In addition, when the buddy is changed, the level of the previous buddy and the character information thereof is not taken over thereby, and the level of the buddy (second game element) and character information thereof after the change is set to an initial value (the lowest value). In addition, the buddy setting unit 73 outputs image information of the buddy to the image generation unit 62 for the menu screen shown during the battle or at some other time.

The advice information provision unit 74 acquires advice information corresponding to the ability of the buddy (character information) from the game server 2, and outputs it to the image generation unit 62 and the audio generation unit 63 so as to output the advice information to the image generation unit 53 and the audio output unit 54.

The battle execution unit 75 manages a progress of the entire game. The battle execution unit 75 generates and outputs card setting information from card identification information of cards and hands, placed in each of the field region, base region and force region etc.; and information relating to a situation of arrangement of the cards etc., in a standby phase of the battle and a card usage preparation phase. The battle execution unit 75 determines a card selection and an action of a card by a touch operation etc. performed by the player using the operation input unit 51 and the like, generates and outputs action selection information which is information of the card selection and the action thereof.

The display control unit 76 controls image display of the entire game displayed on the display 11. The display control unit 76 displays a deck formation screen.

When the display control unit 76 displays the deck formation screen on the display 11, the display control unit 76 reads image identification information of front faces of cards from card data based on card identification information recorded in in-hand card data, and then reads images based on the read image identification information of the front faces of the in-hand cards. The display control unit 76 arranges and displays the read image in the card region 1102 in accordance with a card display format which indicates card display positions in the card region 1102. When the player performs a slide operation, which is described later, to a card displayed in the deck region 1101 so that the moved card is displayed in the card region 1102, the display control unit 76 also displays the card in accordance with the card display format.

When the player performs a slide operation to a card displayed in the card region 1102 so that the display control unit 76 displays the moved card in the deck region 1101, the display control unit 76 displays the moved card in accordance with a deck display format. The deck display format indicates card display position in the deck region 1101 similar to the card display format.

Figure 11:
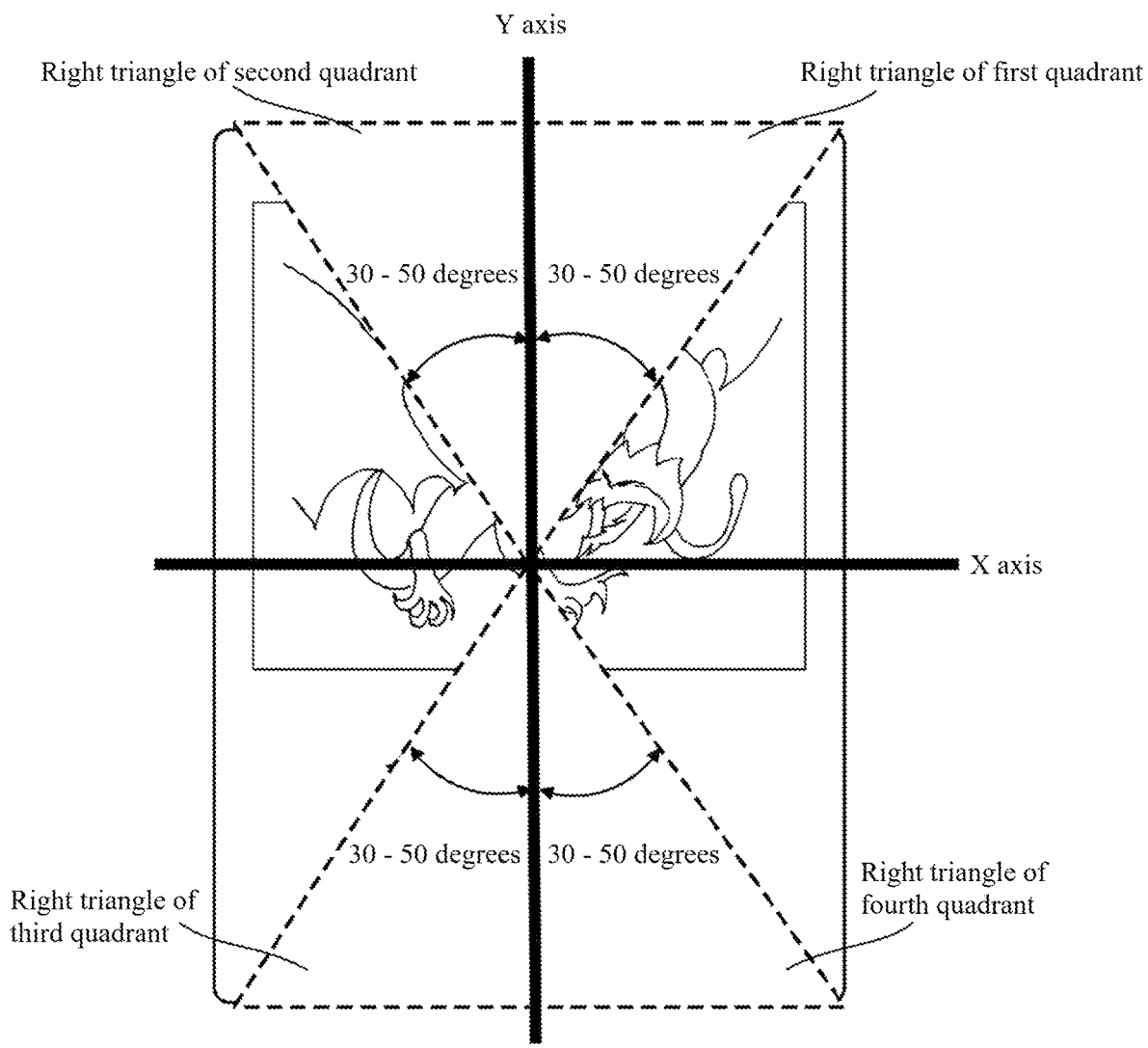
FIG. 11 is a diagram illustrating an example of a grip region of a card according to the present embodiment.

A grip region is set in the card, and when an operation input signal from a region other than the grip region is output from the operation input unit 51, the display control unit 67 cancels the output. If the card grip region is displayed in a manner such that the player can visually recognize it, there is a possibility that the appearance of the card may be impaired, so that the grip region is not displayed. Therefore, it is better to set the card grip region to part where it is easy for the player to naturally touch, or to intuitively touch. As shown in FIG. 11, for example, such a place where the player can easily touch with natural, may be in a range of an angle of about from 30 to 50 degrees from a Y axis, toward an X axis in each quadrant in case where the center of a card is defined as the origin, a longitudinal direction of the card is defined as the Y axis, and a shorter side direction thereof is defined as the X. That is, the region is in the shape of a triangle, wherein the Y axis is one of adjacent sides thereof and a vertex angle thereof is about 30 to 50 degrees in each of the first, second, third and fourth quadrants. The part where it is easy for the player to intuitively touch, may be an area where a character is drawn. In addition, the grip region is preferably set in an area of a lower half of the card. This prevents the player from confusing some other operation to the card with an operation to the grip region thereby causing an unintended display.

When a touch operation to the grip region of the card is maintained, that is, the operation input signal indicating a long pressing operation or slide operation is output, the display control unit 76 turns the card located in that position into a movable state based on operation position information indicated by the operation input signal. In the movable state, the card can be virtually moved by an operation of the player. In the movable state, the display control unit 76 displays a cutdown version of the card at the position touched by the player so that the player can understand the card is in the movable state. At this time, the display control unit 76 does not change the display of the card in the card region 1102. The display control unit 76 displays the cutdown version of the card, following the movement of the player's slied operation. The display control unit 76 releases the movable state when the input operation unit 51 outputs an operation input signal indicating an end of the input operation (for example the finger is lifted). That is, the operation input unit 51 ends the display of the cutdown version of the card. At that time, the card is displayed in the deck region 1101 when the end position of the input operation is in the deck region 1101.

The display control unit 76 performs cancellation when the operation input unit 51 outputs an operation input signal indicating an operation to a region other than the grip region of the card. That is, the display control unit 76 does not make the card movable when the operation input unit 51 outputs the operation input signal indicating the operation to the region other than the grip region of the card. The determination performed by the display control unit 76 as to whether or not the operation is performed to the region other than the grip region of the card, can be realized by a method of determination based on operation position information included in the operation input signal and position information of the grip region, which can be recognized from the card display format (or deck display format) or the like.

The communication control unit 62 performs communication connection for data communication with the game server 2, and data processing. The data communication is started at least one of: case where the data for communication with the game server 2 is generated, case where the battle execution unit 75 outputs data for communication with the game server 2 in accordance with a progress of the game, and case where data is received from the game server 2. The data transmitted by the communication control unit 62 is, for example, card setting information outputted from the battle execution unit 75 and action selection information and the like. The data received by the communication control unit 62 is, for example, battle results etc.

The image generation unit 63 generates one game image screen per one frame time (for example, 1/60 second) based on a processing result performed by the game calculation unit 61 and control information from the display control unit 76, and outputs the generated image signal for the game screen to the image displaying unit 53. Functions of the image generation unit 63 can be realized by, for example, a processor, such as a GPU, digital signal processor (DSP) etc., a video signal IC, a program for video codec etc., an IC memory for drawing frames such as a frame buffer etc., and an IC memory which is used for texture data development and the like.

Based on the processing result of the game calculating unit 61, the audio generation unit 64 generates audio signals for sound effects and BGM, audio information of operation assistance information, and various operation sounds or the like, which are related to the game, and outputs these audio signals to the audio output unit 54. Functions of the audio generation unit 64 can be realized by, for example, a processor such as a digital signal processor (DSP), an audio synthesis IC, etc., an audio codec capable of reproducing an audio file and the like.

The image display unit 53 displays various game screens based on an image signal(s), which is input from the image generation unit 63. For example, functions of the image display unit 53 can be realized by a display device, such as a flat panel display, a cathode ray tube (CRT), a projector, a head-mounted display, etc. In FIG. 2, the image display unit 53 corresponds to the display 11.

The audio output unit 54 outputs sounds such as game related sound effects or the like, based on an audio signal inputted from the audio generation unit 64. In FIG. 2, the audio output unit 54 corresponds to the speaker 13.

The communication unit 55 achieves communication by connecting with the communication line N. Functions of the communication unit 55 can be realized by, for example, a wireless communication device, a modem, a TA (terminal adapter), a jack of a communication cable and a control circuit for wired communication, and the like.

In the memory unit 56, programs for causing the player terminal 1 to perform operations and for realizing various functions provided in the player terminal 1, and data etc. used during running of the programs, are stored in advance, or such programs and data are temporarily stored every time each processing is performed. The memory unit 56 can be realized by, for example, an IC memory, such as a RANI, a ROM, a flash memory, etc., a magnetic disk such as a hard disk, etc., or an optical disc, such as a CD-ROM, a DVD, etc.

In the memory unit 56, a system program and a game program are stored. The system program realizes a basic function of the player terminal 1 as a computer. The game program causes the processing unit 52 to function as the game calculating unit 61. This program is distributed from the game server 2 or some other application distribution server or the like when an account of the player is registered.

Further, in-hand card data D1, card character data D2, deck setting data D3, and buddy setting data D4 and card synthesizing data D5 is stored in the memory unit 56. In addition, model data and texture data for displaying images of card characters and buddies, motion data, effect data, background images of game screens, sound data such as sound effects, etc. is accordingly distributed as data needed for the game and is stored in the memory unit 56.

Figure 12:
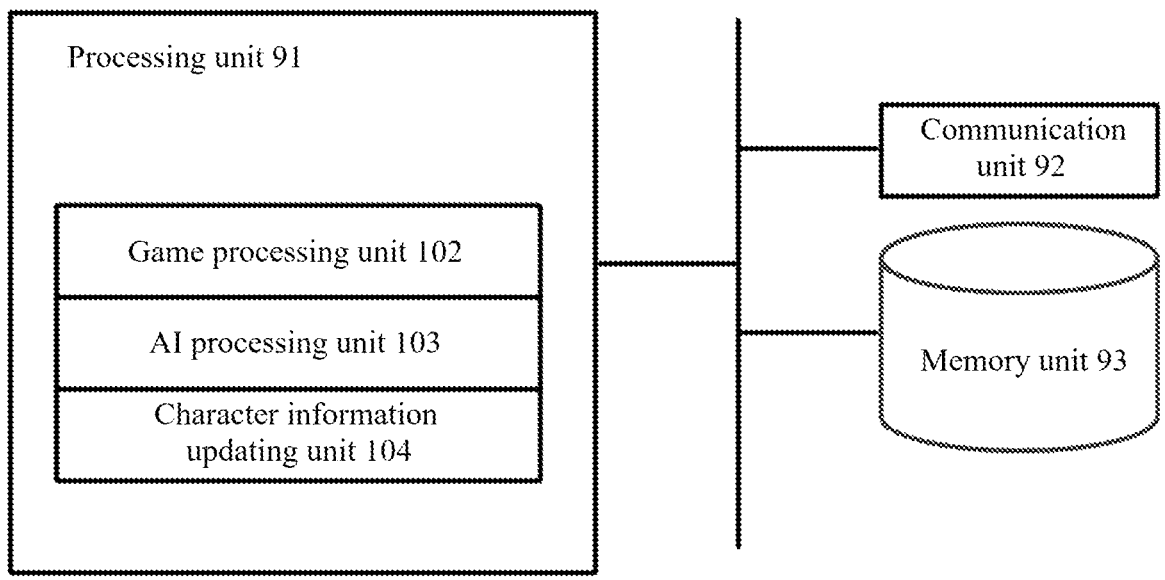
FIG. 12 is a schematic view of a game server 2.

Next, description of the configuration of the game server 2 will be given. FIG. 12 is a block diagram illustrating an example of a functional configuration of the game server 2. The game server 2 includes a processing unit 91, a communication unit 92 and a memory unit 93.

The processing unit 91 includes a game processing unit 102, an AI processing unit 103, and a character information updating unit 104.

The player management unit 101 manages an account and a state of progress etc. of the game by using the user information data, for each of the player terminals 1.

The game processing unit 102 receives card setting information and action selection information etc. from the player terminal 1, performs battle processing by using the card setting information, the action selection information, and the card data, and outputs the battle results.

The AI processing unit 103 has a learning model obtained by performing machine learning, in which training data such as details of progress of many battle games and results thereof etc. is used. Although deep learning (deep machine learning) is representative of a method of the machine learning, it is not limited thereto.

The AI processing unit 103 receives the card setting information or the action selection information, which is transmitted from the player terminal 1, and character information of the buddy for the player of the terminal 1, and outputs operation assistance information in the situation of the card setting information or action selection information. In addition, in the learning model of the AI processing unit 104, the output contents of the operation assistance information are different from each other, depending on the character information of the buddy (buddy's ability). As an example of such a learning model, the higher the character information level of the buddy (buddy's ability) is, the search time for the optimal solution is made longer, so that the more appropriate solution than that in a certain situation can be obtained, as the level of the character information of the buddy (the buddy's ability) is higher. Therefore, even if pieces of the card setting information or action selection information transmitted from the player terminal 1 are the same as each other, as described above, when the character information of a buddy of the player (buddy's ability) differs, there is a possibility that different operation assistance information may be output.

The character information updating unit 104 receives card setting information or action selection information and the battle result from the game processing unit 102, calculates various parameters of the character information (level, card comprehension level, personality, synchronization level) by using these pieces of information, and increases or updates the character information (buddy's ability) of the players A and B in the user information data D6. In addition, the update of the character information (buddy's ability) is made to not only the card setting information, the action selection information and the battle result but also information other than the information relating to the battle, such as the number of times of login.

The communication unit 92 achieves communication by connecting with the communication line N.

In the memory unit 93, a system program and a game program are stored. The system program realizes a basic function of the game server 2 as a computer. The game program causes the processing unit 91 to function as the player management unit 101, the game management unit 102, the AI processing unit 103, the character information updating unit. Further, in the memory unit 92, the user information data and the card data is stored.

The user information data is basic data of players who take part in the game, and the user information data is stored for each player. The user information data basically includes the user identification information of the player, in-hand card data D1 of the player, the deck setting data D3 of the player and the buddy setting data D4 of the player.

The card data includes data for all the cards used in the present game. Data which is basically similar to the above-described card character data, is stored for all the cards used in the game. In addition, the card data may include basic data for a buddy (buddy identification information, a character image, a buddy name, an initial value of the level, an initial value of a card comprehension level, an initial value of personality, and an initial value of a synchronization level), which is used in the present game.

[Operation]

Figure 13:
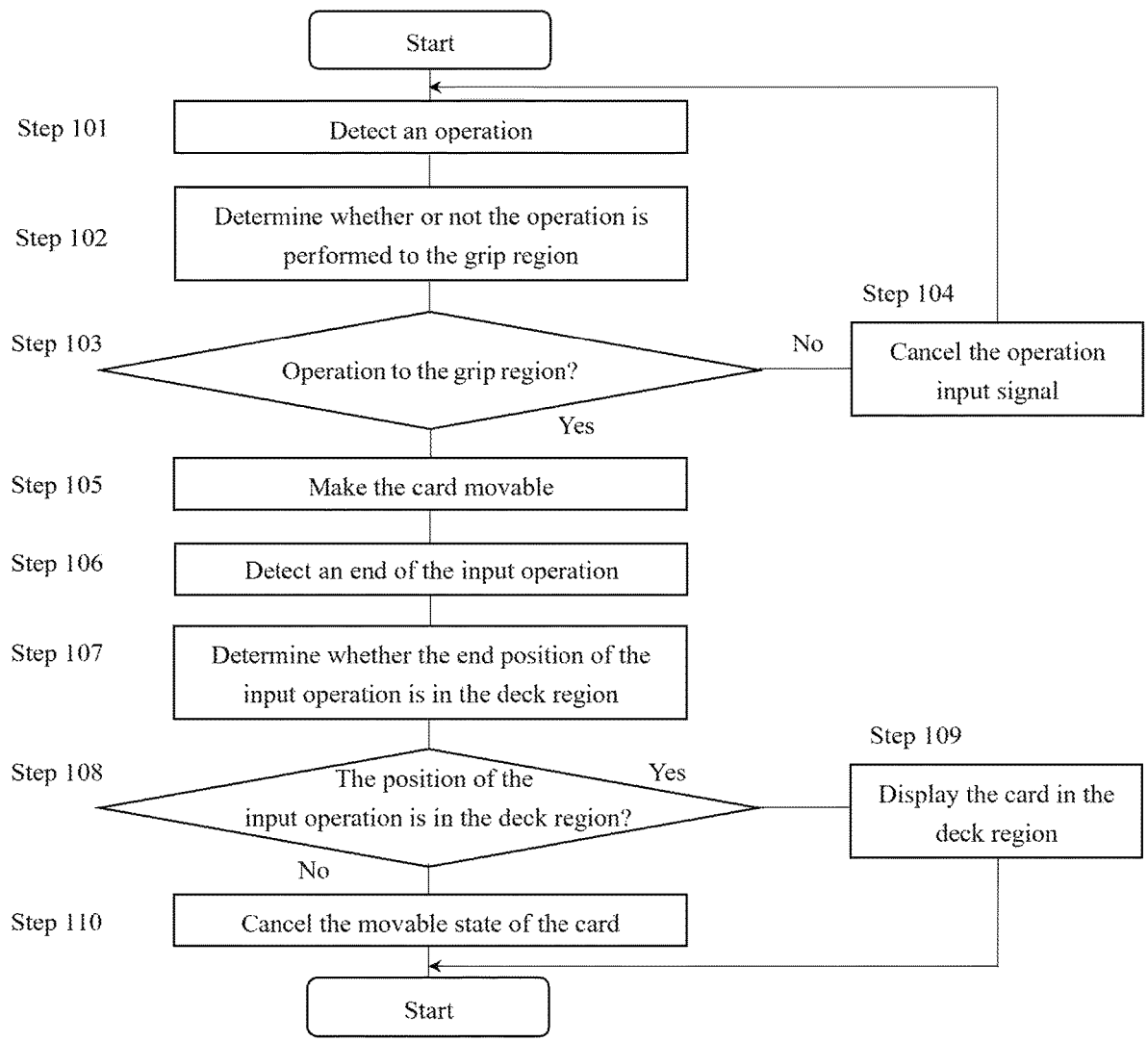
FIG. 13 is a flowchart illustrating an operation according to the present embodiment.

An operation in case where the player forms a deck from the deck formation screen will be described. FIG. 13 is a flowchart illustrating an operation according to the present embodiment. In the description set forth below, the case where it is turned into a movable state when the player performs a slide operation is exemplified.

Figure 14:
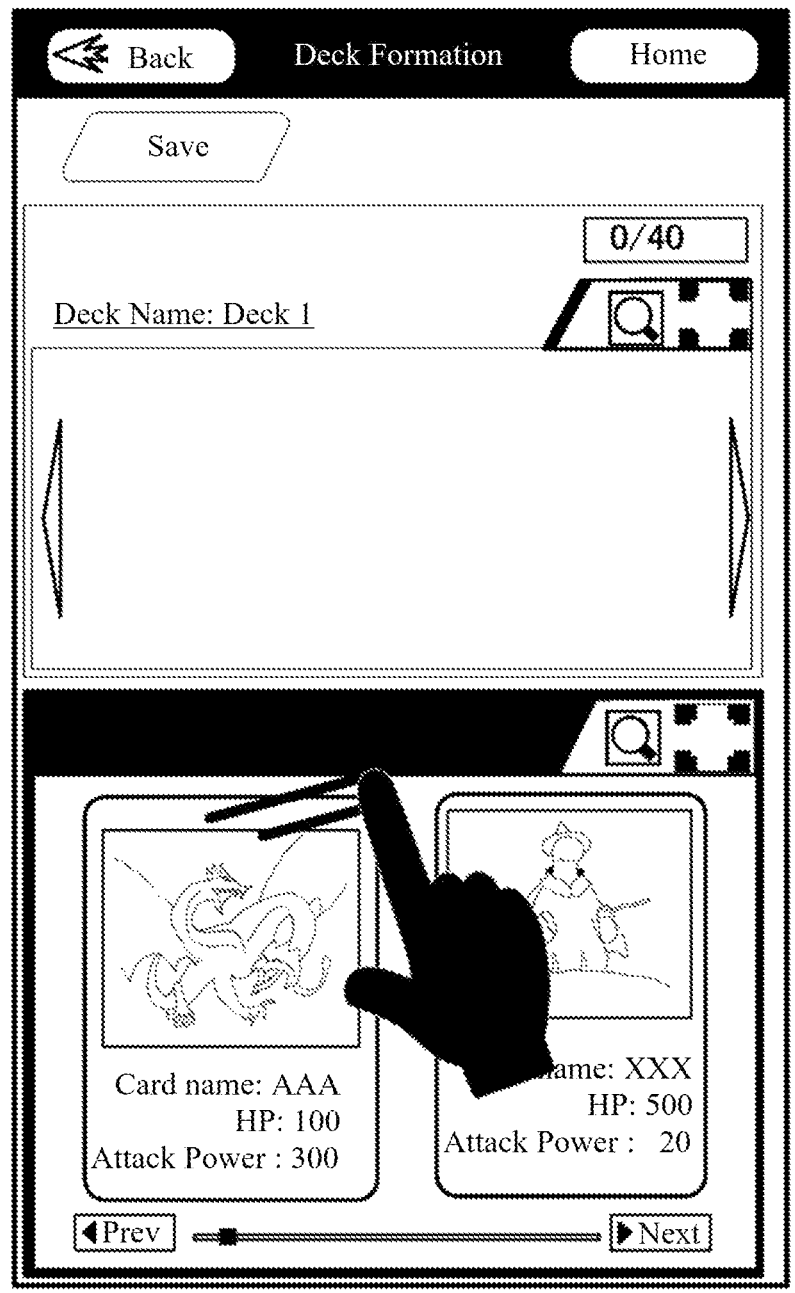
FIG. 14 is a diagram illustrating an example of a display screen according the present embodiment.

The operation input unit 51 detects an input operation by the player, and outputs the operation input signal (Step 101). Here, as shown in FIG. 14, the player performs a slide operation to the grip region of the card on the left side of the card region 1102. The operation input unit 51 outputs an operation input signal indicating that a slide operation has been performed to the grip region of the card on the left side of the card region 1102.

The display control unit 76 determines whether or not the operation input signal indicates a slide operation to the grip region of the card in the card region 1102 (Step 102). The display control unit 76 determines that the operation input signal does not indicate the slide operation is performed to the grip region of the card in the card region 1102 (Step 103: No), the operation input signal is canceled (Step 104) and the processing returns to Step 101.

The display control unit 76 determines that the operation input signal indicates the slide operation is performed to the grip region of the card in the card region 1102 (Step 103: Yes), the display control unit 76 makes the card located at that position movable (Step 105).

Figure 15:
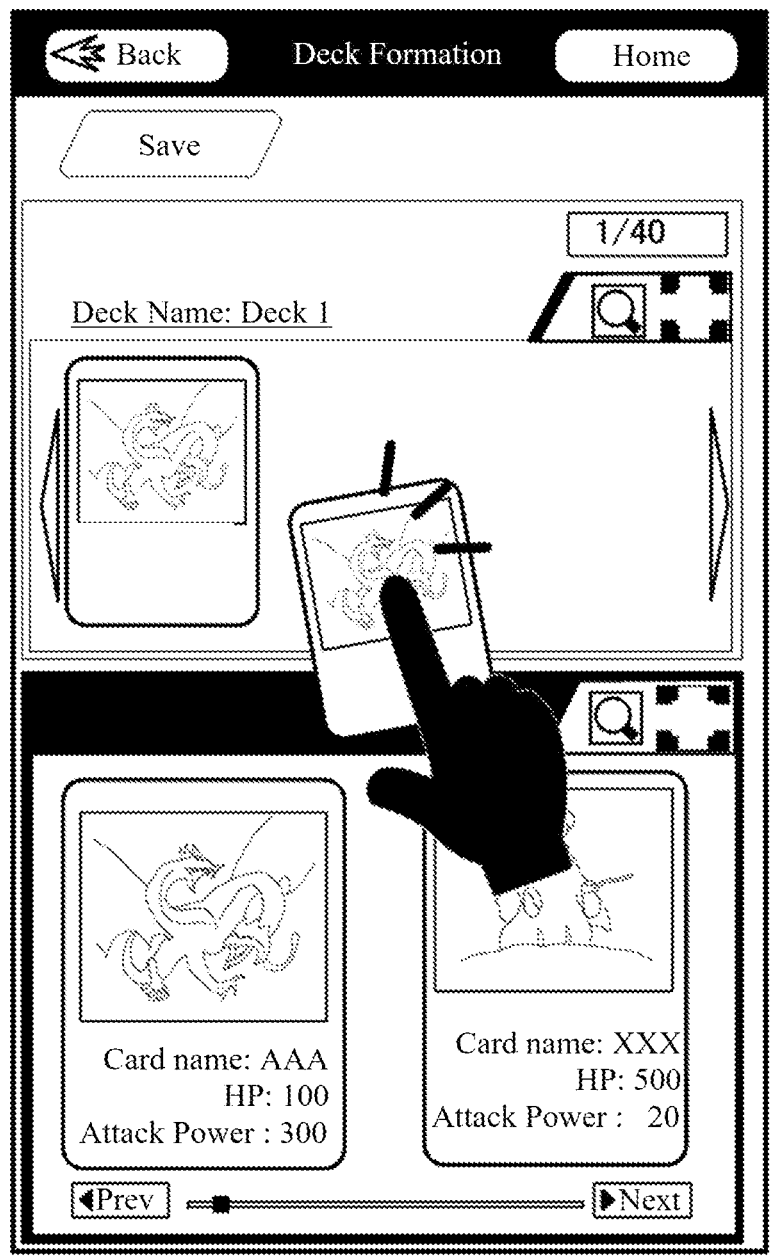
FIG. 15 is a diagram illustrating an example of a display screen according the present embodiment.

In FIG. 15, it is assumed that after the card is turned into the movable state and the player performs a slide operation to the card, the player lifts his or her finger from the display. The input unit 51 detects an end of the input operation performed by the player, and outputs an operation input signal indicating the end of the input operation and the end position of the input operation (Step 106). The display control unit 76 determines whether the end position of the input operation is in the deck region 1101 (Step 107).

If the display control unit 76 determines that the end position of the input operation is in the deck region 1101 (Step 108: Yes), the display control unit 76 displays an image of that card in the deck region 1101 (Step 109). If the display control unit 76 does not determines that the end position of the input operation is in the deck region 1101 (Step 108: No), the display control unit cancels the movable state (Step 110).

In addition, although in the above description, an example of a card used in a game is explained, the present invention can be applied to case where an object displayed on a screen is moved by an operation of the player (user).

In addition, although in the above description, a movement of card from the card region 1102 to the deck region 1101 is mainly exemplified, the present application is not limited thereto, and the present invention can be applied to a movement from the first region to the second region.

In addition, in the above description, the configuration, in which in-hand cards owned by the player are displayed in the card region 1102, is explained, but all the cards may be displayed. All the card means all of the cards prepared by the game administration side. Cards, which the player does not own, are also displayed in the card region 1102. In such a configuration, the in-hand cards are displayed in a color, and the cards, which the player does not own are displayed in a color different from the color of the in-hand cards (for example, grayscale, a reduced shade, a mono color etc.), or the cards are displayed in silhouette so that the cards, which the player does not own, are displayed in a display form in which the cards the player does not own can be distinguished from the in-hand cards.

In the above-description, the operation input unit 51 detects a player's operation to a region other than the grip region of the card, the display control unit 76 disregards an operation input signal generated in accordance with the detected operation input, but some other configuration is possible. For example, if the operation input unit 51 determines that the detected operation input is generated by an operation to a region other than the grip region of the card, the operation input signal is not output.

In addition, in the above description, the grip region is a region where it is easy for the player to naturally touch, or to intuitively touch. However, if an explanation such as explanation of an operations etc. is set in advance and provided, the grip region may be any place in the card.

In addition, in the above configuration, the display control unit 76 displays a cutdown version of the card, which is in a movable state. However, as long as the player understands that it is in a movable state, it may be displayed in some other form such as in simplified version of the card, grayscale, a reduced shade, a mono color etc.

[Additional Remark 1]

A terminal for executing a battle game in which a player uses first game elements comprises a memory in which an execution instruction are stored; and a processor, wherein based on the execution instruction, the processor performs display processing for displaying, in a first region, game elements for a deck, which are selected from game elements owned by the player, and for displaying the owned game elements in a second region on a screen which is the same as the screen on which the first region is displayed, and control processing in which the game elements are made movable on the screen under the condition that an operation is performed to a predetermined part of the game elements shown in the first region or the second region.

As described above, although the preferred embodiments are exemplified to explain the present invention, the present invention is not necessarily limited to the above-described embodiments, and can be modified and practiced in various manners within a technical idea of the present invention.

REFERENCE SIGNS LIST

1 Player terminal
2 Game server
11 Display
12 Touch operation panel
13 Speaker
51 Operation input unit
52 Processing unit
53 Image display unit
54 Audio output unit
55 Communication unit
56 Memory unit
61 Game calculation unit
62 Image generation unit
63 Audio generation unit
64 Communication control unit
70 Player information management unit
71 Card management unit
72 Deck setting unit
73 Buddy setting unit
74 Advice information provision unit
75 Battle execution unit
76 Display control unit
91 Processing unit
92 Communication unit
93 Memory unit
102 Game processing unit
103 AI processing unit
104 Character information updating unit

The invention claimed is:

1. A non-transitory computer readable medium storing a program, which causes a computer to perform display processing for displaying, in a first region, a game element for a deck, which is selected from in-hand game elements of a player, and displaying the in-hand game elements in a second region on a screen, which is the same as that on which the first region is displayed; and control processing for turning the game element into a movable state on the screen under the condition that an operation is performed to a predetermined part of the game element displayed in the first region or the second region, wherein in the display processing, the game element is displayed as an image of a card which is rectangular in shape, and the predetermined part is in a shape of a right triangle in which a Y axis is an adjacent side when a center of the card is defined as an origin, a longitudinal direction of the card is defined as the Y axis, and a shorter side direction thereof is defined as an X axis.

2. The non-transitory computer readable medium storing a program according to claim 1, wherein the movable state is terminated in the control processing under a condition that the operation ends.

3. The non-transitory computer readable medium storing a program according to claim 1, wherein in the control processing, the game element is not turned into the movable state on the screen when the operation is performed on part other than the predetermined part.

4. The non-transitory computer readable medium storing a program according to claim 1, wherein in the display processing, the predetermined part is not displayed on the screen.

5. The non-transitory computer readable medium storing a program according to claim 1, wherein the predetermined part is set in an area of a lower half of the game element.

6. The non-transitory computer readable medium storing a program according to claim 1, wherein a vertex angle of the right triangle is about 30 to 50 degrees.

* * * * *